United States Patent [19]

Wagner et al.

[11] Patent Number: 5,009,950
[45] Date of Patent: Apr. 23, 1991

[54] COMPOSITE STRUCTURES

[75] Inventors: Joachim Wagner, Cologne; Karl Peltzer, Leichlingen; Werner Rasshofer, Cologne, all of Fed. Rep. of Germany

[73] Assignee: Bayer Aktiengesellschaft, Bayerwerk, Fed. Rep. of Germany

[21] Appl. No.: 323,454

[22] Filed: Mar. 14, 1989

[30] Foreign Application Priority Data

Mar. 22, 1988 [DE] Fed. Rep. of Germany ....... 3809524

[51] Int. Cl.$^5$ .................. C08G 18/00; B32B 5/02; B32B 5/26; B32B 5/28
[52] U.S. Cl. .................. 428/290; 428/213; 428/334; 428/423.1; 521/167; 521/51; 521/163; 528/68; 528/76; 528/77; 264/257; 264/258; 264/261; 264/331.19
[58] Field of Search .................. 521/51, 163, 167; 264/257, 258, 261, 331.19; 528/68, 76, 77; 428/422.8, 423.1, 47, 109, 105, 113, 114, 215, 220, 224, 286, 290, 323, 339, 375, 505, 284, 213, 298, 303, 334

[56] References Cited

U.S. PATENT DOCUMENTS

| 4,218,543 | 8/1980 | Weber et al. | 521/51 |
| 4,774,263 | 9/1988 | Weber et al. | 521/51 |
| 4,774,264 | 9/1988 | Weber et al. | 521/51 |
| 4,779,459 | 10/1988 | de Rego | 92/103 F |
| 4,794,129 | 12/1988 | Gillis | 528/73 |

OTHER PUBLICATIONS

Becker/Braun, Kunststoff-Handbuch, vol. 7, "Polyurethane", Carl Hanser Verlag, Munich/Vienna, 1983, pp. 406 et seq.

Primary Examiner—Jay H. Woo
Assistant Examiner—Jeremiah F. Durkin
Attorney, Agent, or Firm—Joseph C. Gil; Thomas W. Roy

[57] ABSTRACT

The present invention is directed to composite structures by thermoplastically shaping an assembly of at least two flat thermoplastically formable plastic materials placed in layers one above the other and optionally at least one upper, lower and/or intermediate layer containing a reinforcing or filler material under such conditions of temperature and pressure that shaping is accompanied by intimate union of the individual layers of the assembly, characterized in that at least one of the flat plastic materials is based on a polyisocyanate polyaddition product having a density of at least 0.8 g/cm$^3$ which has been prepared by the reaction of
(a) aromatic polyisocyanates,
(b) compounds having a molecular weight of 1800 to about 12000 and containing a statistical average of at least 2.5 isocyanate-reactive groups, optionally
(c) diamines in the molecular weight range of 108 to 400 containing two primary and/or secondary aromatically bound amino groups, and optionally
(d) (cyclo)alkanepolyols and/or (cyclo)alkanepolyamines in the molecular weight range of 60 to 1799 optionally containing ether groups, by a single stage or multi-stage process at an isocyanate index of 60 to 140, wherein at least one of components (c) or (d) is used in a quantity such that the total quantity of components (c) and (d) is at least 5% by weight, based on the weight of component (b).

8 Claims, No Drawings

COMPOSITE STRUCTURES

BACKGROUND OF THE INVENTION

1. Field of the Invention

The present invention is directed to a new process for the production of composite structures by the thermoplastic shaping of an assembly based on at least two flat thermoplastically shapable plastic materials arranged in layers one above the other and optionally reinforcing lower, upper and/or intermediate layers, wherein the plastics materials are based at least partly on selected polyisocyanate polyaddition products. The present invention is also directed to the composite structures obtained by this process.

2. Description of the Prior Art

Thermoplastic polyurethane elastomers are known (see e.g. Becker/Braun, Kunststoff-Handbuch, Volume 7, "Polyurethane", publishers Carl Hanser Verlag, Munich/Vienna (1983), pages 406 et seq). Previously known thermoplastically workable polyurethane elastomers are based on diisocyanates, relatively high molecular weight dihydroxyl compounds, in particular relatively high molecular weight polyester diols, and low molecular weight diols as chain lengthening agents. It was previously believed that the polyurethanes should be linear in structure, i.e., they should have no crosslinks or branch points in the molecule It has also previously been recommended that diamines should not be used as chain lengthening agents for the production of thermoplastically shapable polyurethane elastomers (see the reference book mentioned above, page 406, paragraph 8.2.1) because diamine chain lengthening agents incorporate urea groups in the molecule The urea groups are regarded as hard segments which would prevent thermoplastic shaping of the product.

It has now surprisingly been found that polyisocyanate polyaddition products which have been prepared from branched, relatively high molecular weight starting components containing isocyanate-reactive groups, in particular those in which the number of urea groups exceeds the number of urethane groups, can be thermoplastically processed and, thus, are suitable for the production of composite structures produced by thermoplastic shaping.

SUMMARY OF THE INVENTION

The present invention is directed to a process for the production of composite structures by thermoplastically shaping an assembly comprising at least two flat thermoplastically formable plastic materials placed in layers one above the other and optionally at least one upper, lower and/or intermediate layer containing a reinforcing or filler material under such conditions of temperature and pressure that shaping is accompanied by intimate union of the individual layers of the assembly, characterized in that at least one of the flat plastic materials is based on a polyisocyanate polyaddition product having a density of at least 0.8 g/cm$^3$ which has been prepared by the reaction of (a) aromatic polyisocyanates, (b) compounds having a molecular weight of 1800 to about 12,000 and containing a statistical average of at least 2.5 isocyanate-reactive groups, optionally (c) diamines in the molecular weight range of 108 to 400 containing two primary and/or secondary aromatically bound amino groups, and optionally (d) (cyclo)alkanepolyols and/or (cyclo)alkanepolyamines in the molecular weight range of 60 to 1799 optionally containing ether groups, by a single stage or multi-stage process at an isocyanate index of 60 to 140, wherein at least one of components (c) or (d) is used in a quantity such that the total quantity of components (c) and (d) is at least 5% by weight, based on the weight of component (b).

The present invention is also directed to the composite structures prepared by this process.

DETAILED DESCRIPTION OF THE INVENTION

To carry out the process according to the invention, an "assembly" is first prepared from at least 2, preferably 2 to 8, and more preferably 2 to 4 thermoplastically shapable plastic parts placed in layers one above the other. The assembly may optionally in addition contain lower, upper and/or intermediate layers of filler materials, in particular reinforcing materials. This "assembly" is subjected to a process of thermoplastic shaping under such conditions of temperature and pressure that it is accompanied by intimate union of the individual layers so that a stable composite system is obtained.

The individual layers of the above-mentioned assembly generally have a thickness of about 0.01 to 10 mm, preferably about 0.1 to 5 mm, but this thickness is not critical in order to carry out the process. It is also possible, for example, to employ the principle of the invention for producing a composite structure from a thick walled plastic part and a comparatively thin plastic layer. It is particularly preferred to employ the process according to the invention for the production of multi-layered plastic laminates having a thickness of about 0.1 to 30 mm, preferably about 0.4 to 10 mm, in which reinforcing materials are optionally incorporated.

An essential feature of the invention is that at least one, preferably several and most preferably all of the above-mentioned plastics materials used for the "assembly" are selected from elastomeric polyisocyanate polyaddition products in the density range of 0.8 to 1.4 g/cm$^3$, in particular 1.0 to 1.3 g/cm$^3$, which have been prepared from the above-mentioned starting materials.

Suitable aromatic polyisocyanates (a) include in particular the compounds mentioned in EP-B-0,081,701, column 3, line 30 to column 4, line 25 (U.S. Pat. No. 4,774,263, herein incorporated by reference). Those mentioned as preferred are also preferred for the purpose of this invention. Isocyanate semi-prepolymers obtained by the reaction of aromatic diisocyanates such as 4,4'-diisocyanatodiphenylmethane with subequivalent quantities of relatively high molecular weight polyhydroxyl compounds of the type mentioned under (b) below at an NCO/OH equivalent ratio >2 may also be used as component (a).

Component (b) includes compounds in the molecular weight range of 1800 to about 12,000, preferably about 3000 to 7000 (the molecular weights are determined by a titration of the end groups to provide the OH numbers), and containing isocyanate-reactive groups. Component (b) has a functionality or average functionality above 2.5 in the isocyanate addition reaction. The (average) functionality of component b) is preferably 2.5 to 3.0, more preferably 2.8 to 3.0. Compounds which are suitable for use as component (b) include the polyether polyols or mixtures of polyether polyols disclosed in DE-AS 2,622,951, column 6, line 65 to column 7, line 47 (U.S. Pat. No. 4,218,543, herein incorporated by reference). The polyether polyols in which at least 50%, preferably at least 80% of the hydroxyl groups are primary hydroxyl groups are preferred for the purpose of the invention. The hydroxyl-containing polyesters, polythioethers, polyacetals, polycarbonates or polyester amides disclosed in DE-AS 2,622,951 (U.S. Pat. No. 4,218,543, herein incorporated by reference) are also suitable for use as components (b) according to the invention, provided they conform to the conditions indicated above; however, they are less preferred than polyether polyols.

Also suitable as starting components (b) are those aminopolyethers or mixtures of aminopolyethers which conform to the above conditions, i.e. polyethers containing at least 50 equivalent percent, preferably at least 80 equivalent percent of primary and/or secondary aromatically or aliphatically bound, preferably aromatically bound amino groups, the remainder of the isocyanate-reactive groups being primary and/or secondary aliphatically bound hydroxyl groups. Suitable aminopolyethers of this type include, for example, the compounds mentioned in EP-B-0,081,701, column 4, line 26 to column 5, line 40 (U.S. Pat. No. 4,774,263, herein incorporated by reference).

Any mixtures of the polyhydroxyl compounds with the aminopolyethers may, of course, also be used as component (b).

The optional component (c) includes aromatic diamines of the type exemplified in EP-B-0,081,701, column 5, line 58 to column 6, line 34 (U.S. Pat. No. 4,774,263, herein incorporated by reference). The diamines mentioned as preferred in that publication are also preferred for this invention.

The polyols or polyamines optionally used as starting component (d) may be any non-aromatic compounds in the molecular weight range of 60 to 1799, preferably 62 to about 500, and more preferably 62 to about 400, and containing at least two isocyanate-reactive groups. Examples include the polyhydric alcohols mentioned in EP-B-0,081,701, column 9, lines 32-50 (U.S. Pat. No. 4,774,263, herein incorporated by reference). Other suitable compounds include aliphatic polyamines containing ether groups such as polypropylene oxides in the above-mentioned molecular weight range containing terminal primary amino groups. Polyols having cycloaliphatic rings may also be used such as 1,4-dihydroxy-cyclohexane or 1,4-bis-hydroxymethyl-cyclohexane.

It is essential to use at least one of the components (c) or (d) for the preparation of the elastomers. The proportion by weight of component (c) and/or (d), based on the weight of component (b), should be at least 5% by weight, preferably at least 10% by weight. Of these components the elastomers are most preferably prepared solely from the aromatic diamines exemplified under (c). The quantity in which these diamines are used as well as the quantity of amino groups optionally present in components (b) and (d) are preferably calculated to ensure that the molar ratio of urea groups to urethane groups in the elastomers is at least 2:1.

The auxiliary agents and additives (e) optionally used for the production of the polyisocyanate polyaddition products include internal mold release agents, catalysts for the polyisocyanate polyaddition reaction, blowing agents, surface active additives, cell regulators, pigments, dyes, flame retardants, stabilizers, plasticizers and fungistatic or bacteriostatic substances such as those described, for example, in EP-B-0,081,701, column 6, line 40 to column 9, line 31 (U.S. Pat. No. 4,774,263, herein incorporated by reference).

The preferred auxiliary agents and additives include the known fillers and/or reinforcing materials such as barium sulphate, kieselguhr, whiting, mica and in particular glass fibers, LC fibers, glass flakes, glass balls and aramide or carbon fibers. These fillers and/or reinforcing agents may be included in quantities of up to about 80% by weight, preferably up to about 30% by weight, based on the total weight of the filled or reinforced polyisocyanate polyaddition products.

Epoxide resins such as the known polyglycidyl ethers of polyvalent phenols, in particular bisphenol A, having an epoxide equivalent weight range of 170 to 250, may be used as additives, especially when aromatic diamines (c) are used. These epoxide resins are preferably used in subequivalent quantities based on diamines (c) and may first be reacted with the latter at about 50° to 180° C.

The preparation of the polyisocyanate polyaddition products is preferably carried out by the one-shot process in which polyisocyanate component (a) is mixed with a mixture of components (b) to (e) with the aid of suitable mixing apparatus and reacted. It would also be possible in principle to react the polyisocyanate polyaddition products by a "modified one-shot process" in which polyisocyanate component (a) is reacted with a proportion of component (b) and optionally component (d) to form isocyanate semi-prepolymers which are then reacted with a mixture of the remaining components in a single-stage. The elastomers could also conceivably be prepared by the known prepolymer process. The isocyanate index (number of isocyanate groups divided by the number of isocyanate-reactive groups multiplied by 100) is in all cases about 60 to 140, preferably about 80 to 120 and more preferably about 95 to 115.

As already mentioned, the quantity of component (c) (including any amino groups optionally present in component (b)) is preferably calculated to result in a molar ratio of urea groups to urethane groups of at least 2:1 in the elastomers. This ratio is more preferably at least 5:1. In practice, this means that component (c) is preferably used in a quantity of about 5 to 50% by weight, preferably about 10 to 40% by weight, based on the weight of component (b).

The polyisocyanate polyaddition products may also be prepared by the reaction injection molding process in closed molds as described, for example, in DE-AS 2,622,951 (U.S. Pat. No. 4,218,543, herein incorporated by reference) or EP-B-0,081,701 (U.S. Pat. No. 4,774,263, herein incorporated by reference), but the polyisocyanate polyaddition products may also be produced without molds, for example by applying the reaction mixture leaving the mixing apparatus to suitable supports such as metal sheets and allowing it to react.

The polyisocyanate polyaddition products preferably have a density of about 0.8 to 1.4 g/cm$^3$, preferably about 1.0 to 1.3 g/cm$^3$. This means that blowing agents may in some cases be used in small quantities to produce a certain microporous structure or to facilitate processing of the reaction mixtures (improved fluidity).

When a plurality of layers of polyisocyanate polyaddition products of the type mentioned above is used for the preparation of the "assembly" which is to be thermoplastically shaped it is, of course, not necessary to combine polyisocyanate polyaddition products all having the same chemical composition. Polyisocyanate polyaddition products of the type mentioned above but differing in their chemical composition may be used for the preparation of the "assembly" in accordance with the description given above.

The flat shaped polyisocyanate polyaddition product which is essential to this invention may be used either with or without thermoplastic pretreatment for the preparation of the "assembly" used in the process according to the invention. If the polyisocyanate polyaddition products of the type mentioned above are used without a thermoplastic pretreatment, they are preferably prepared in such a manner as to ensure that they are obtained in the form of "flat structures" such as plates or sheets of the type which may be obtained, for example, by the reaction injection molding technique using plate molds or by applying the reaction mixture leaving the mixing apparatus to suitable supports such as metal sheets on which they are spread out flat and allowed to react.

If a thermoplastic pretreatment is carried out on the polyisocyanate polyaddition products, these products may have a wide variety of shapes. For example, plates which have been produced in closed plate molds by the reaction injection molding technique may be further shaped in deep drawing presses or they may be size reduced (granulates or powder) to be thermoplastically shaped into flat structures which are then used for the preparation of the "assembly" which is used in the process according to the invention. Granulates, shavings and/or other small and very small particles of the type, which have previously been obtained as by-products or waste from the production and use of molded articles based on polyisocyanate polyaddition products and which have been disposed of by burning, may now be worked up into flat structures and used for the preparation of the "assembly" in accordance with the process according to the invention.

The thermoplastic pretreatment of the polyisocyanate polyaddition products is generally carried out under a pressure of at least 1 bar, preferably a pressure of about 50 to 400 bar and more preferably about 100 to 200 bar, and at a temperature of at least 20° C., preferably about 50° to 200° C. and more preferably about 130° to 170° C. The molding time may be from one second to 10 minutes. For any given elastomer, operation at lower pressures will, of course, require higher temperatures within the ranges indicated above and vice versa.

The "assembly" used in the process according to the invention may in addition contain other thermoplastically workable plastics, preferably in the form of flat shapes. For example, the components used for the preparation of the "assembly" may include boards or sheets of thermoplastic polyurethanes known in the art; polycarbonates, in particular those based on bisphenol A/- phosgene; polyester resins such as polyethylene and/or polybutylene terephthalates which are optionally ether-modified; polyamides; polyester amides; polyolefins such as polyethylene or polypropylene; polystyrenes optionally modified to increase their impact strength; polyacrylonitrile; and copolymers such as acrylonitrile-butadiene-styrene copolymers.

The plastics material, in particular the polyisocyanate polyaddition products which are essential to this invention, may contain reinforcing materials or fillers such as glass fibers, carbon fibers or mica. On the other hand, lower, upper and/or intermediate layers of reinforcing materials may be used for the preparation of the "assembly" used for the process according to the invention.

Particularly suitable reinforcing layers for this purpose are glass fibers and/or carbon fiber mats in a wide range of weights per unit area. Any woven, knitted or braided materials or nets or sieves, preferably of inorganic materials such as glass, carbon, potassium titanate, steel, iron, aluminum or titanium may also be used.

For the preparation of the "assembly" prepared according to the invention, the individual layers of plastics material and any layers of reinforcing materials may be arranged together in any sequence. An initial composite structure may first be prepared by thermoplastically uniting two or more layers which may but need not include the layer of polyisocyanate polyaddition product according to the invention. This initial structure may then be combined with further layers to form an "assembly" which is used for the process according to the invention. The "assembly" prepared by placing the individual layers one above the other is then subjected to the thermoplastic shaping which must be carried out under the conditions of temperature and pressure previously indicated above in connection with the thermoplastic pretreatment of the polyisocyanate polyaddition products. The process according to the invention may be carried out in known apparatus such as compression molds, calenders or deep drawing presses. The temperature required for carrying out the process may be provided by preheating the apparatus and/or by preheating the "assembly."

The process according to the invention is suitable for the production of exceptionally high quality composite structures, in particular composite films, which may be used for a wide variety of applications, for example, in the form of hollow bodies for inserts, cups and containers of various dimensions and contents; as covers for instrument panels and control panels; and as flat car body parts such as door panels, body panels, mudguards or covers for the engine or luggage and as wheel covers. In flat form, the composite structures are also suitable as writing surfaces, indicator panels with magnetic supports, adhesive labels, protective films and coatings for numerous purposes. The products according to the invention may also be used in the form of small parts which have previously not been obtainable economically by the RIM process such as keyboard elements, hard elastic sealing elements and collars, recessed grips and gripping elements, small damping elements and washers and spacer discs. The products of the process according to the invention may also be used for the production of reinforced or unreinforced sections for cable ducts and sealing lips and for the production of other solid small parts. Additives such as UV absorbents or dyes may, if desired, be incorporated into the composite structures during their production by the process according to the invention.

The invention is further illustrated but is not intended to be limited by the following examples in which all parts and percentages are by weight unless otherwise specified.

EXAMPLES

Starting materials:
Aminopolyether I:
An aminopolyether (NH number 44) prepared by the hydrolsis of an isocyanate prepolymer at 90° C. using a mixture of 3.5 parts by weight of dimethylformamide, 0.1 part by weight of sodium hydroxide and 100 parts by weight of water per 1000 parts by weight of the prepolymer followed by distillative removal of the volatile constituents. The isocyanate prepolymer had an isocyanate content of 3.4% and was obtained by the reaction of 2,4-diisocyanatotoluene with a subsequivalent quantity of a polyether mixture. The polyether mixture consisted of equal parts by weight of (i) the propoxylation product with (OH number 56, OH functionality 2.4) of a mixture of water and trimethylolpropane and (ii) a polyether polyol (OH number 35) prepared by the propoxylation of glycerol followed by ethoxylation of the propoxylation product (ratio by weight of PO:EO=87:13).

Polyetherpolyol I:

A polyethertriol (OH number 28) prepared by the propoxylation of trimethylolpropane followed by ethoxylation of the propoxylation product (ratio by weight of PO:EO=83:17).

Polyisocyanate I:

A commercial polyester-modified 4,4'-diisocyanatodiphenylmethane having an isocyanate content of 19% by weight (Desmodur M53, Manufacturers: Bayer AG, Leverkusen).

Polyiscyanate II:

A modified polyisocyanate having an isocyanate content of 24.5% and prepared by the reaction of 4,4'-diisocyanatodiphenylmethane with a subequivalent quantity of tripropylene glycol.

Polyiscyanate III:

A polyisocyanate mixture of the diphenylmethane series having an isocyanate content of 31% by weight and consisting of 66% by weight of 4,4'-diisocyanatodiphenylmethane, 2% by weight of 2,4'-diisocyanatodiphenylmethane and 32% by weight of higher functional polyisocyanates.

DETDA:

A mixture of 65 parts by weight of 1-methyl-3,5-diethyl-2,4-diaminobenzene and 35 parts by weight of 1-methyl-3,5-diethyl-2,6-diaminobenzene.

Epoxy modified DETDA:

A product obtained by reacting at 100° C. 26 parts by weight of DETDA with 4 parts by weight of bisphenol A diglycidyl ether having an epoxide equivalent weight of 190.

Stabilizer I;

A commercial polyether polysiloxane (L 5304 of Union Carbide).

Internal mold release agent I:

A mixture of equal parts by weight of (i) zinc stearate and (ii) the condensation product of 5 moles of propylene oxide and 1 mole of ethylene diamine.

Internal mold release agent II:

Polyricinoleic acid having an acid number below 5.

Catalyst I:

Triethylenediamine, 33% by weight solution in tripropylene glycol (DABCO 33 LB of Air Products).

Catalyst II:

A commercial zinc catalyst (UL 28 of Witco Co.).

Thermoplastic Polyurethane:

A commercial thermoplastic polyurethane (Desmopan 385 of Bayer AG, Leverkusen).

Reinforcing agent I:

Glass fibers having an average length of about 100 to 300 μm and an average diameter of about 14 μm (milled fiber MF 7901 of Bayer AG, Leverkusen).

Reinforcing agent II:

1/64 glass flakes of Owens-Corning Co.

PREPARATION OF POLYISOCYANATE POLYADDITION PRODUCTS EXAMPLES 1 TO 6

General process conditions (Examples 1 to 3):

The formulations given in Examples 1 to 3 below were processed as follows:
Machine: Laboratory piston metering apparatus;
Mold: Plate mold of steel, internal dimensions 300 ×200×4 mm;
Mixhead: MQ 8 of Hennecke, Sankt Augustin;
Operating Pressure: 180 bar;
Filling time: 1 second;
Temperatures of raw material: 65° C. (A component) and 50° C. (B component);
Mold temperature: 70° C.
Residence time in mold: 30 seconds;
External mold release agent: RCTW 2006 of Chemtrend.

General process conditions (Examples 4 to 6):

The formulations given in Examples 4 to 6 below were processed under substantially analogous process conditions but the temperature of the raw materials was 35° and 40° C., respectively, the temperature of the mold was 60° C., the filling time was 1.25 seconds and the residence time in the mold was 30 seconds.

EXAMPLE 1

A Component:
58.6 parts by weight of aminopolyether I,
28.8 parts by weight of DETDA,
0.9 parts by weight of Stabilizer I,
5.6 parts by weight of internal mold release agent I,
6.1 parts by weight of internal mold release agent II.
B Component: Polyisocyanate I
Ratio by weight A:B=100:99 (isocyanate index: 110).

EXAMPLE 2

A Component:
The same as in Example 1 but mixed with 50% by weight, based on Component A free from reinforcing agent, of reinforcing agent I.
B Component:
As in Example 1.
Ratio by weight of A:B=100:66 (Isocyanate index: 110).

EXAMPLE 3

A Component:
The same as Example 1 but mixed with 50% by weight, based on the A Component free from reinforcing agent, of Reinforcing agent II.
B Component:
Same as in Example 1.
Ratio by weight of A:B=100:66 (Isocyanate index: 110).

EXAMPLE 4

A Component:
77 Parts by weight of polyetherpolyol I,
23 parts by weight of DETDA,
0.3 parts by weight of Catalyst I,
0.1 part by weight of Catalyst II.
B Component:
Polyisocyanate component II.
Ratio by weight of A:B=100:51 (Isocyanate index=100).

EXAMPLE 5

A Component:
62 Parts by weight of aminopolyether I,
26 parts by weight of epoxide-modified DETDA,
1.0 part by weight of Stabilizer I, 6 parts by weight of internal mold release agent I,
5 parts by weight of internal mold release agent II,
41 parts by weight of Reinforcing agent I.

B Component:
Mixture of equal parts by weight of polyisocyanate I and polyisocyanate III, isocyanate content of the mixture: 25% by weight.

Ratio by weight of A:B=100:45 (Isocyanate index=110).

EXAMPLE 6

A Component:
60 Parts by weight of aminopolyether I,
28.5 parts by weight of DETDA,
5.8 parts by weight of internal mold release agent I,
4.7 parts by weight of internal mold release agent II,
1 part by weight of Stabilizer I.

B Component:
As in Example 5.

Ratio by weight of A:B=100:68 (Isocyanate index=110).

In all of the preceding examples, the A Component was intimately mixed with the B Component in the machine indicated above and worked up into plates having the dimensions indicated above and worked up into plates having the dimensions indicated. The density of the polyisocyanate polyaddition products without fillers was about 1.10 g/cm$^3$ and the density of the products containing reinforcing agent was about 1.25 g/cm$^3$.

PROCESS ACCORDING TO THE INVENTION (EXAMPLES 7 TO 16)

EXAMPLE 7

Starting from plates 4 mm in thickness according to Example 1, moldings 2 mm in thickness were produced in a suitably heated compression mold at a temperature of 160° C. and a pressure of 200 bar.

Two such moldings were placed together in each case to form a double "assembly" which was then molded in the same mold for 2 minutes at a molding temperature of 150° C. and under a molding pressure of 40 bar to produce a double laminate having a thickness of 4 mm.

Two of these double laminates were then molded together under the same conditions (160° C./200 bar) to produce a 4-layer laminate having a thickness of 4 mm.

Two of these 4-layer laminates were then molded together under the same conditions to form an 8-layer laminate having a thickness of 4 mm.

The thicknesses of the laminates obtained from the molding process were controlled in each case by means of suitable spacer elements. The properties of the laminates obtained are shown in the following Table:

TABLE

|  | Single layer | 2-layer Laminate | 4-layer Laminate | 8-layer |
| --- | --- | --- | --- | --- |
| Tensile strength | 41 MPa | 44 MPa | 40 MPa | 70 MPa |
| Elongation at break | 240% | 84% | 80% | 33% |
| G' Modulus 100 C | 175 MPa | 180 MPa | 165 MPa | 170 MPa |
| Flex Modulus 120 C | 486 MPa | 540 MPa | 495 MPa | 495 MPa |
| Shore hardness A | 79 | 80 | 79 | 80 |

EXAMPLE 8

A 3-fold assembly of plates according to Examples 1 and 2 having the structure 1/2/1 were pressed together to form a 3-fold laminate of thickness of 4 mm under the temperature and pressure conditions mentioned in Example 7.

The core of the resulting laminate was therefore a glass fiber filled polyisocyanate polyaddition product, while the upper and lower layers consisted of materials without filling. The surface of such a laminate was much smoother than conventionally produced glass fiber filled RIM products. The G' modulus and flex modulus of the laminate were approximately equal to those given in Example 7.

EXAMPLE 9

A laminate of the structure 1/3/1 was produced as in Example 8 from the plates of Examples 1 and 3. The resulting 3-fold laminate had a thickness of 4 mm, a core of polyisocyanate polyaddition product filled with glass flakes and upper and lower layers of unfilled materials. The surfaces of such laminates were very much smoother than the surfaces of conventional molded products filled with glass flakes and produced by the RIM process. The laminate had an elongation at break of 120% and an ultimate tensile strength of 40 Mpa.

EXAMPLE 10

A 3-fold laminate of the structure 3/4/3 and thickness of 4 mm was produced as in Example 8 from the plates of Examples 3 and 4.

The laminate obtained had a smooth surface and the visual effect of a metallic coating.

EXAMPLE 11

A 2-fold laminate with a very smooth surface with having an appearance similar to that of metallic coating was produced from boards of Examples 4 and 5 under the temperature and pressure conditions mentioned in Example 8.

EXAMPLE 12

A fine mesh metal sieve having a thickness of 0.13 mm and openings measuring 0.1 mm was placed between two plates each 2 mm in thickness of the Thermoplastic Polyurethane and sealed into place in a compression mold for 2 minutes at 40 bar in 150° C.

Plates 1 mm in thickness were produced from the plates of Example 6 by molding under a pressure of 100 bar and a temperature of 150° C. for 2 minutes.

One of these plates was used as upper layer and one as lower layer, respectively, and combined with the polyurethane-sealed metal sieve to form an "assembly" which was then compression molded for 2 minutes at a temperature of 150° C. and under a pressure of 40 bar to form a 3-fold laminate having a thickness of 3 mm.

EXAMPLE 13

Example 12 was repeated but using a perforated aluminum sheet of thickness of 1 mm instead of the aforesaid metal sieve. A metal reinforced 3-fold laminate was again obtained.

EXAMPLE 14

Example 12 was repeated but with a glass fiber fabric of thickness of 1 mm instead of the metal sieve. A reinforced 3-fold laminate was again obtained.

EXAMPLE 15

A 3-fold laminate obtained according to Example 10, measuring 20×30×4 mm, was compressed in a box-shaped compression mold measuring 20×50×10 mm at 150° C. and 100 bar for 2 minutes to form a box of corresponding dimensions having a wall thickness of 1 mm. The excess material was cut off.

EXAMPLE 16

Starting from a plate 4 mm in thickness according to Example 1 and a plate of ABS 2 mm thickness, a laminated plate 1 mm in thickness was produced in a compression mold at 160° C and 200 bar. In contrast to the preceding examples according to the invention, the individual plates were heated to the molding temperature by preheating in a heating cupboard for 10 minutes.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A composite structure comprising at least two different flat, thermoplastically formable plastic materials which is prepared by a process which comprises placing said materials in layers one above the other and thermoplastically molding said materials under sufficient conditions of temperature and pressure that molding is accompanied by intimate union of individual layers of the structure, wherein at least one of said materials is based on a polyisocyanate polyaddition product containing at least one group selected from the group consisting of urea and urethane groups, having a density of at least 0.8 g/cm$^3$ and prepared by reacting at an isocyanate index of about 60 to 140
   (a) an aromatic polyisocyanate with
   (b) a compound having a molecular weight of about 1800 to 12,000 and containing an average of at least 2.5 isocyanate reactive groups and
   (c) at least 5% by weight, based on the weight of component (b), of a member selected from the group consisting of diamines having a molecular weight of 108 to 400 and containing two primary aromatically bound amino groups, diamines having a molecular weight of 108 to 400 and containing two secondary aromatically bound amino groups, diamines having a molecular weight of 108 to 400 and containing one primary aromatically bound amino group and one secondary aromatically bound amino group,
   aliphatic polyols having a molecular weight of 60 to 1799, cycloaliphatic polyols having a molecular weight of 60 to 1799, aliphatic polyamines having a molecular weight of 60 to 1799 and cycloaliphatic polyamines having a molecular weight of 60 to 1799.

2. The composite structure of claim 1 which consists essentially of plastic materials based on said polyisocyanate polyaddition products.

3. The composite structure of claim 1 wherein said composite structure additionally contains at least one layer comprising a member selected from the group consisting of glass fiber mats, carbon fiber mats and mixtures thereof.

4. The composite structure of claim 2 wherein said composite structure additionally contains at least one layer comprising a member selected from the group consisting of glass fibers mats, carbon fiber mats and mixtures thereof.

5. The composite structure of claim 1 which comprises conducting said thermoplastic molding at a temperature of about 50° to 200° C. and a pressure of about 50 to 400 bar.

6. The composite structure of claim 1 wherein said materials have a thickness of 0.01 to 10 mm and said composite structure has a thickness of 0.1 to 30 mm.

7. The composite structure of claim 1 wherein the molar ratio of urea groups to urethane groups is at least 2:1.

8. The composite structure of claim 2 wherein the molar ratio of urea groups to urethane groups is at least 2:1.

* * * * *